(12) United States Patent
Kryger et al.

(10) Patent No.: US 8,590,276 B2
(45) Date of Patent: Nov. 26, 2013

(54) TOWER ELEMENT

(75) Inventors: Arne Kryger, Langeskov (DK); Lars Ryholl, Middelfart (DK)

(73) Assignee: Andresen Towers A/S, Nyborg (DK)

( * ) Notice: Subject to any disclaimer, the term of this patent is extended or adjusted under 35 U.S.C. 154(b) by 301 days.

(21) Appl. No.: 12/865,505

(22) PCT Filed: Feb. 5, 2009

(86) PCT No.: PCT/DK2009/050035
§ 371 (c)(1),
(2), (4) Date: Jul. 30, 2010

(87) PCT Pub. No.: WO2009/097858
PCT Pub. Date: Aug. 13, 2009

(65) Prior Publication Data
US 2010/0319276 A1    Dec. 23, 2010

(30) Foreign Application Priority Data
Feb. 6, 2008 (DK) .................................. 2008 00164

(51) Int. Cl.
*E04C 3/00* (2006.01)
(52) U.S. Cl.
USPC ... 52/845; 52/843; 52/40; 52/301; 52/651.01; 403/334; 405/249
(58) Field of Classification Search
USPC ........ 52/845, 843, 844, 40, 300, 301, 651.01, 52/848, 849; 405/249, 251; 403/333, 334, 403/335, 336, 337
See application file for complete search history.

(56) References Cited

U.S. PATENT DOCUMENTS

| 448,972 | A | * | 3/1891 | Lynch ............................. 52/300 |
| D21,074 | S | * | 9/1891 | Milliken ...................... D25/128 |
| 1,334,851 | A | * | 3/1920 | Glass ............................. 403/318 |
| 4,395,857 | A | * | 8/1983 | Sheets et al. .................... 52/245 |

(Continued)

FOREIGN PATENT DOCUMENTS

| WO | WO 03/083236 | 10/2003 |
| WO | WO 2004/083633 | 9/2004 |
| WO | WO 2005/075763 | 8/2005 |

OTHER PUBLICATIONS

International Search Report, issued Apr. 16, 2009, for PCT International Application No. PCT/DK2009/050035.

*Primary Examiner* — Robert Canfield
*Assistant Examiner* — Matthew Gitlin
(74) *Attorney, Agent, or Firm* — Pearl Cohen Zedek Latzer Baratz, LLP

(57) ABSTRACT

The invention concerns a tower element for a tower, preferably for a wind power plant, where several tower elements with an outer surface and an inner surface are mounted on top of each other, where the periphery of the tower element is made up of a number of segments provided with inwardly facing flanges at the longitudinal sides, the flanges being connected to corresponding flanges on laterally arranged segments. The individual segments are made with an overlap on the outer surface in the transverse joints and with a butt joint at the inwardly facing flanges. By the invention there is achieved flexibility in production and during transport and mounting. With an overlap on the outer surface between two segments, mechanical joining can be performed between two segments in transverse direction. This mechanical joint between two segments results in a more stable construction and a rigidity substantially corresponding to the rigidity that may be achieved in segments joined by welding.

12 Claims, 5 Drawing Sheets

(56) References Cited

U.S. PATENT DOCUMENTS

| | | | |
|---|---|---|---|
| 5,263,297 A * | 11/1993 | Kim | 52/834 |
| 7,160,085 B2 * | 1/2007 | de Roest | 416/244 R |
| 7,360,340 B2 * | 4/2008 | Grundman et al. | 52/40 |
| 7,392,624 B2 * | 7/2008 | Kinzer | 52/194 |
| 7,770,343 B2 * | 8/2010 | Montaner Fraguet et al. | 52/223.5 |
| 7,802,412 B2 * | 9/2010 | Jensen | 52/651.07 |
| 7,877,935 B2 * | 2/2011 | Ollgaard | 52/40 |
| 2002/0194794 A1 * | 12/2002 | Hill et al. | 52/40 |
| 2005/0166521 A1 * | 8/2005 | Silber | 52/633 |
| 2006/0213145 A1 * | 9/2006 | Haller | 52/651.01 |
| 2006/0272244 A1 * | 12/2006 | Jensen | 52/223.5 |
| 2007/0294955 A1 * | 12/2007 | Sportel | 52/40 |
| 2009/0016897 A1 * | 1/2009 | Olgaard | 416/244 R |
| 2010/0126115 A1 * | 5/2010 | Lim et al. | 52/848 |
| 2011/0308197 A1 * | 12/2011 | Wallace | 52/846 |

* cited by examiner

TOWER ELEMENT

CROSS-REFERENCE TO RELATED APPLICATIONS

This application is a National Phase Application of PCT International Application No. PCT/DK2009/050035, International Filing Date Feb. 5, 2009, claiming priority of Danish Patent Application No. PA 2008 00164, filed Feb. 6, 2008, both of which are incorporated by reference herein.

FIELD OF THE INVENTION

The present invention concerns a tower element for a tower, preferably for a wind power plant, where several tower elements are mounted on top of each other, where the tower element has an outer surface and an inner surface, where the periphery of the tower element is made up of a number of segments preferably made of steel, where these segments are provided with inwardly facing flanges at the longitudinal sides, where these flanges are connected to corresponding flanges on laterally arranged segments, thus constituting a casing for a tower element.

BACKGROUND OF THE INVENTION

It is commonly known to use various types of tower designs for i.a. modern wind power plants. Through the years, different variants have been applied, e.g. lattice work designs; however, in recent years the most preferred have particularly been steel towers made with tubular shape. These are typically made in lengths that allow handling on common roads and mainly with common transport means. When the tower elements reach the erection site, the tower is typically assembled of three or more tower segments, in some cases constituting an assembled tower of more than 100 metres or even over 150 metres.

Since nothing indicates that such towers for wind power plants will be smaller in the future, it is necessary with solutions that allow transport via the roads if not other and appreciably more expensive transport solutions are to be applied. It is thus a fact that the size of these towers is increasing, and that it is not uncommon for the towers to have such a large diameter that transporting via the road network is no longer possible without dividing the individual tower elements into lesser sections.

From WO 2004/083633 is known a solution where a tower element is divided into three sections longitudinally of the element. The individual sections are assembled by flanges at the long sides, constituting a traditional tower element when assembled. Such tower elements still require much workshop time for rolling and welding and are furthermore cumbersome to transport as yet.

Also, from WO 2005/075763 it is known to make towers for wind power plants in segments. These segments are assembled with traditional flange joints in the longitudinal direction of the segments and can be made with rectangular shape or with tapering shape. The horizontal joints between two adjoining segments are made without joining and are just sealed with a suitable sealing means. The reason for not joining the joints in horizontal direction mechanically is apparently due to the fact that on other prior art tower constructions there is the tradition that welded tower elements have a weakness in these joints. The joints are exposed to fatigue loads which in time cause rupture in the horizontal weld seams. In the solution described in WO 2005/075763, the individual segments are mounted displaced relative to the laterally arranged segment with an offset corresponding to between 50% and 75% of the length of the segment. The case is thus that the tower in principle is constructed of elements that are mounted with breaking joint or bond.

Towers made according to this principle have some drawbacks, however. For one thing, it is necessary with different lengths of segments in order to mount the segments with offset. Moreover, a tower element cannot be assembled on the ground which subsequently is hoisted in place on one or more already mounted tower sections, if the case is a conical tower as the joint faces are large in vertical direction. This process may, however, be performed more easily by making cylindric towers, but still with great difficulty.

An object of the invention includes a solution for a tower, preferably a tower for a wind power plant, where the tower is constructed of prefabricated segments, where production, transport and mounting of these segments can be effected in an easy way and where there is a large degree of flexibility in these steps.

SUMMARY OF THE INVENTION

As mentioned above, the invention concerns a tower element for a tower, preferably for a wind power plant, where the periphery of the tower element is made up of a number of segments provided with inwardly facing flanges at the longitudinal sides for mounting to corresponding flanges on laterally arranged segments, where the individual segments are made with an overlap on the outer surface in the transverse joints and with a butt joint at the inwardly facing flanges.

By such a tower element there is achieved the great advantage and flexibility that production in the form of machining, surface treatment, transport and mounting of the individual segments can be performed in a much easier way than possible with tower elements which are welded together and finished in a factory. Compared with the closest prior art as described above, there is the great advantage of the solution according to the invention that in the overlap existing on the outer surface between two segments arranged in continuation of each other, a mechanical joining can be performed between the two segments in transverse direction. This mechanical joint between two segments results in a more stable construction and a rigidity substantially corresponding to the rigidity that may be achieved in segments joined by welding. A joint between segments without joining in transverse direction is less rigid, thus obviously providing a design which is exposed to larger deflections during operation. The mechanical joint may be designed such that very small movements between the two segments are allowed, or alternatively, the joint can be made as a fit joint that provides optimal rigidity in the joint.

Also, a mechanical joining is performed in longitudinal direction occurring between the inwardly facing flanges. The inwardly facing flanges on two laterally arranged segments can be made identical, where e.g. there are two plane flanges which are interconnected, but the flanges may also be made different such that there are two different flanges which e.g. engage each other.

During mounting of the segments, and also subsequently, the mechanical joint is relieved in the overlap on the outer surface in that the inwardly facing flanges are with a butt joint where an upper segment in principle rests on the inwardly facing flanges of a lower segment. Simultaneously with achieving an advantageous joint and overlap between two segments, easy and secure mounting is thus also achieved as it is easy for the fitters to ascertain whether and that the segments are in correct position.

In a preferred variant of a tower element according to the invention, one or more corners on the inwardly facing flange are notched on at least the downwardly facing edge of a segment, where in transverse direction the edge rests on the inwardly facing flange on a previously mounted segment. Thus is achieved the secure positioning of the segments and an overlap as described above. The notched corner may be with one or more contact faces such that in principle it is a joint where a segment engages a corresponding notching with several faces on another segment. The preferred variant is, however, with a notching where a single surface in a notching on a segment is brought in contact with a corresponding surface on another segment.

A tower element for a tower according to the invention may be where segments are joined with other and previously mounted segments in a tower element. Alternatively, one or more segments may be joined with one or more foundation segments. These foundation segments may be adapted for embedding in a concrete foundation or for mounting on a foundation of one or another suitable kind. Foundation segments may, for example, constitute a reinforcement of at least part of the lowermost part of the tower element. This may be achieved by making the foundation segments such that they constitute a reinforcement of the construction in that the material thickness is increased by tower element segments and the foundation segments overlapping each other by e.g. one, two, three metres, or more. In this way there can easily be made a reinforcement that allow for a door opening in the side of the tower.

Similarly, segments for a tower element on the upwardly facing edge on a segment may be with one or more notched corners on the inwardly facing flange for abutting on e.g. another segment in a tower element or a top element. By a notching in both top and bottom of the segments there may thus be made an overlap with a height corresponding to the total height of the two notchings. The use of a top element is, as mentioned, also a possibility, and such a top element may in principle be segments that are finished by a traditional flange for mounting the object or objects to be mounted on the tower, e.g. a nacelle for a wind power plant.

In order to increase the strength of the joint between respective segments, the butt joint on the inwardly facing flanges may be overlapped by the inwardly facing flange of the laterally arranged segment. Thus is not only achieved an overlap between two segments mounted above each other but also an overlap on the inwardly facing flanges between two laterally mounted segments.

Joints between the segments at the longitudinal and inwardly facing flanges and at the transverse overlap may advantageously be assembled entirely or partly by bolts and nuts, but rivets or combinations of bolts and rivets may be used as well.

A tower element for a tower where the periphery of the tower element is made up of a number of segments according to the invention may be assembled such that all segments in the tower element are substantially of equal length, indicating a tower element that substantially appears with segments that start and end at the same height. But it may also be with segments that are substantially of equal length, indicating a tower element that substantially appears with segments that start and end at at least two different heights, respectively. By the first variant there is achieved an overlap which is only constituted by the notched corners, while in the second variant there may be an overlap corresponding to half a segment length. In principle the joint is a joint where the segments are staggered.

Individual segments may be assembled into a finished tower element prior to mounting on foundation segments or on a previously erected tower element, but may also be constructed by one segment at a time. The segments of which the tower element is made may be plane on the outer surface or with one or more bends. A tower element may thus appear as an edged tower with a number of surfaces corresponding to the number of segments, but may also appear less edged in that the segments are made with e.g. two bending lines in longitudinal direction, whereby the tower will appear with three times as many edges.

The inwardly facing flanges may advantageously be used for fastening for storey partitionings and possible internal reinforcements in the tower. Furthermore, the inwardly facing flanges as well as the transverse flanges overlap may be further strengthened by loose flanges which are co-mounted into the mechanical joint. The longitudinal may e.g. be reinforced by flat iron rods that are clamped on both sides of two inwardly facing flanges.

Calculations of costs of towers constructed of segments as described here show that already at a tower height of about 60 metres it is cheaper to use this building principle as compared with welded towers. Moreover, the material thickness may in some cases be reduced from 48 mm to 16 mm, whereby obviously a lower material price is attained, but also a much easier handling during production as well as by mounting. If the segments are made in lengths of 12 to 18 metres, it is possible to transport them by usual transporting means and by lengths up to about 12 metres even in closed standard containers, and by longer segments in special containers. Another and very significant advantage is that the segments can be corrosion protected by galvanising, as the segments are no larger than they may be handled during the galvanisation process.

BRIEF DESCRIPTION OF THE DRAWINGS

The invention is described in the following with reference to the drawings, wherein.

DETAILED DESCRIPTION OF THE INVENTION

Figure 1:
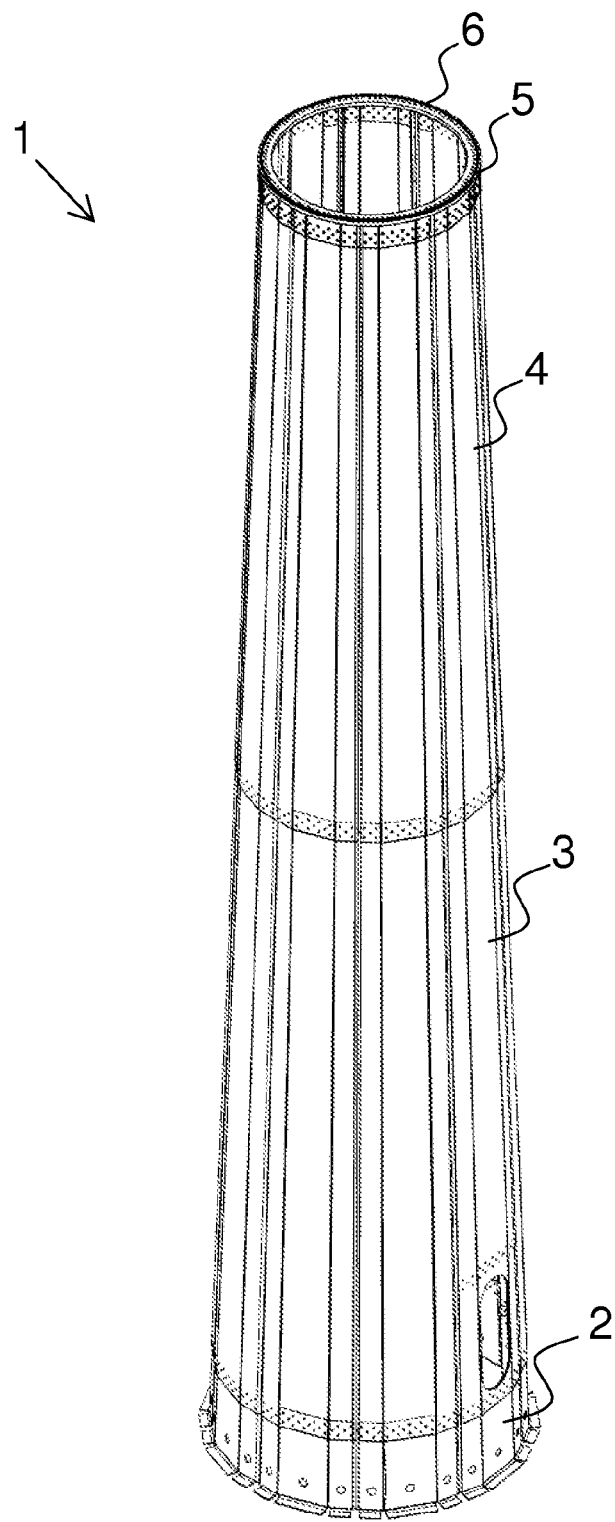
FIG. 1 shows a complete tower constructed of segments.

In FIG. 1 appears a complete tower 1 which e.g. is suited for use in connection with a modern wind power plant. In the shown variant, the tower 1 is constructed with a foundation element 2 which is fixed to a concrete foundation in the earth. The foundation element 2 is made up of segments and will be described in more detail under the description of FIG. 4.

Upon the foundation element 2 there is mounted a tower element 3 and a further tower element 4. Both of these tower elements are made according to the same principle, and the only difference is in principle that they do not have the same diameter as the bottom diameter on the tower element 4 corresponds to the top diameter on the tower element 3 such that these fit together. At the top of the tower element 4 is mounted a top element 5 with a flange 6 for mounting e.g. a yawing ring or other objects.

Figure 2:
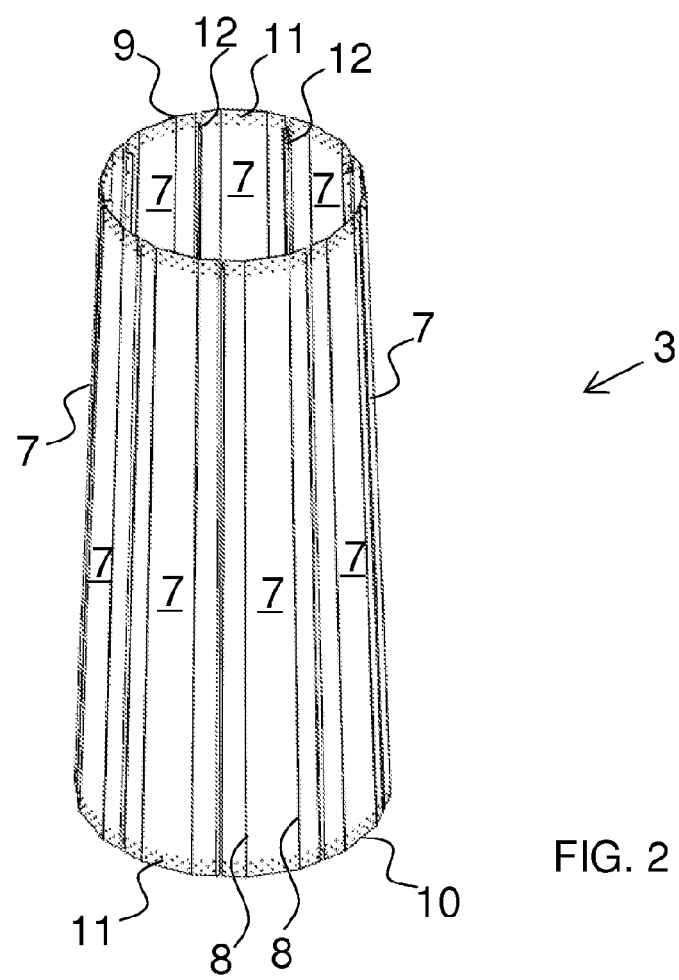
FIG. 2 shows a single tower element constructed of segments.

In FIG. 2 is seen a tower element 3 consisting of nine identical segments 7. As it appears from the Figure, the individual segments 7 are made with two longitudinal bending lines 8, whereby the tower element 3 appears with eighteen edges. However, it is obvious that a tower 1 constructed according to the invention may be provided with segments 7 without the longitudinal bending lines 8, or with more than two bending lines 8. At the top 9 and at the bottom 10 of the tower element 3, a plurality of holes 11 appears for fastening adjoining elements. The longitudinal inwardly facing flanges 12 are seen inside the tower element 3.

Figure 3:
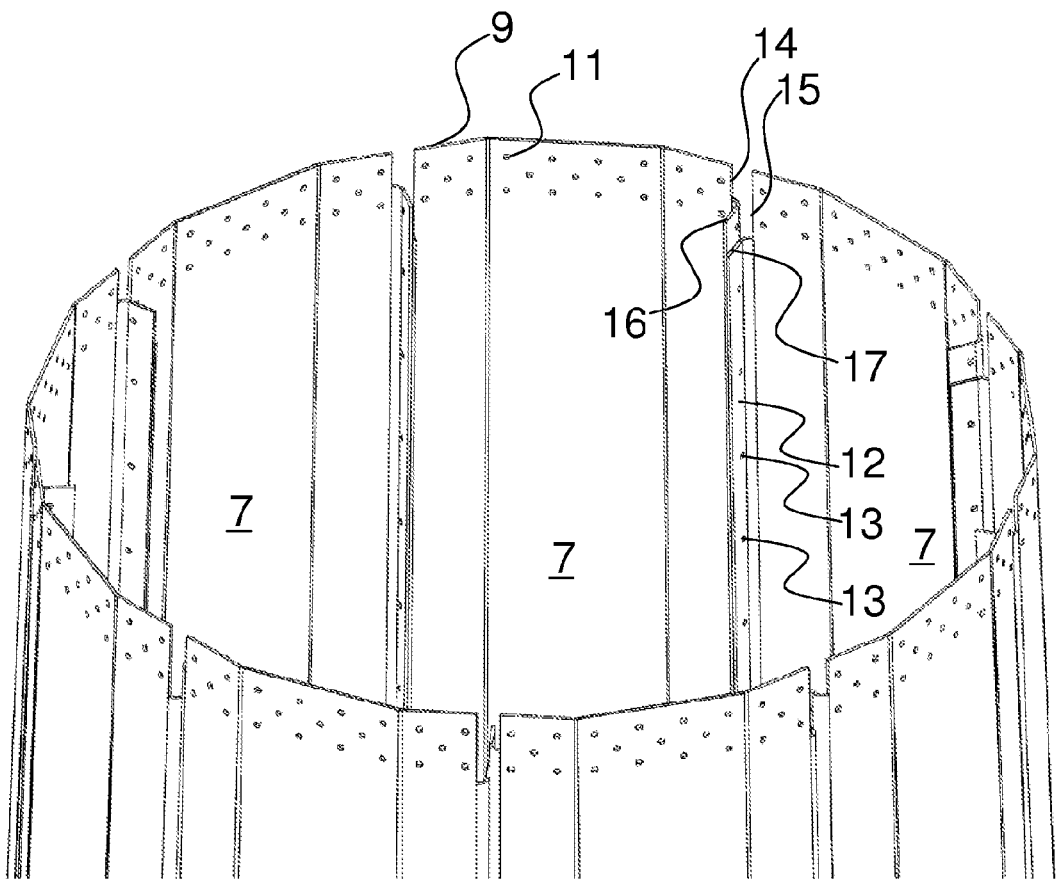
FIG. 3 shows details at the top of a tower element.

In FIG. 3, which is an enlargement of the top 9 of the tower element 3 in FIG. 2, again there is seen the individual segments 7 with three rows of holes 11 for fastening a tower element 4 or a top element 5. Moreover appears the inwardly facing flanges 12 which are also with holes 13 for joining with the laterally arranged segment 7. At the top of the inwardly facing flanges 12 is seen that the corners 14 and 15 on the flange 12 are notched. Hereby, two contact faces 16 and 17 appear at the end of the inwardly facing flanges 12. These contact faces 16 and 17 are displaced such that by a tower segment 7, which is mounted resting on the contact face 17, is achieved an overlap with the inwardly facing flange 12 of the laterally arranged segment. The individual tower segments 7 are formed at the bottom 10 with corresponding notched corners.

Figure 4:
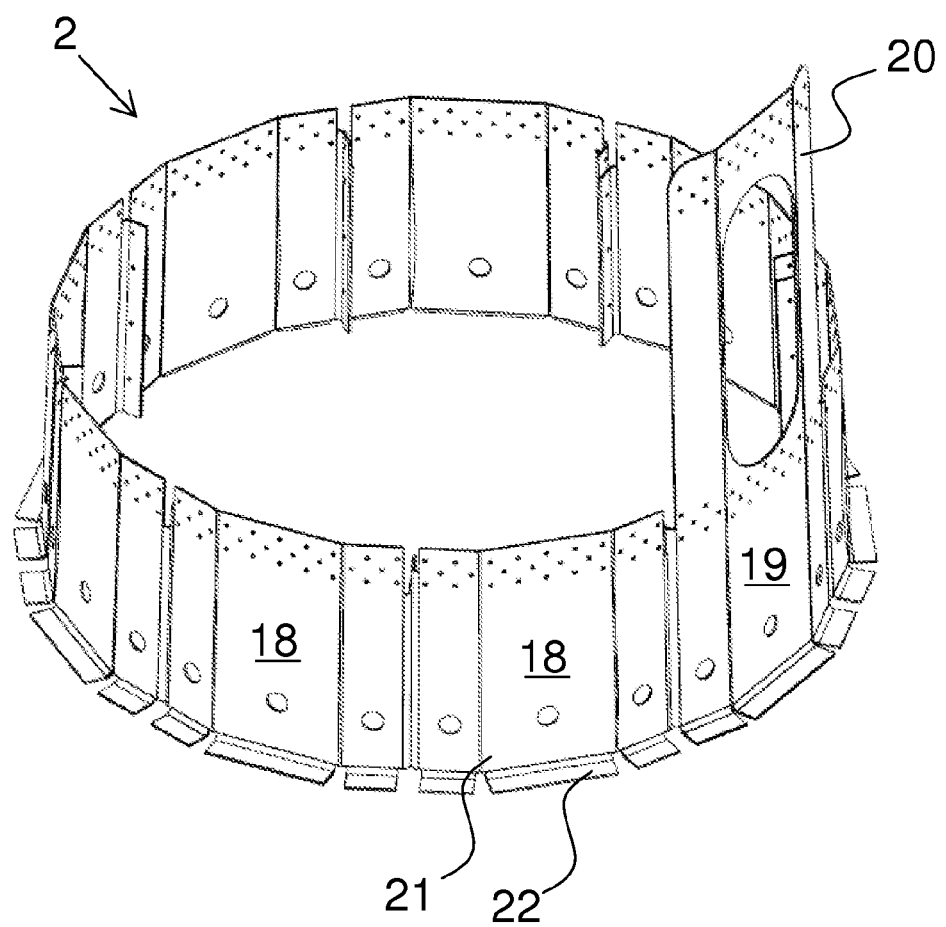
FIG. 4 shows a foundation element with door frame.

In FIG. 4 appears a foundation element 2 which is made up of 9 segments of which eight 18 are identical and the ninth 19 includes a door frame 20. The door frame 20 constitutes a reinforcement that outbalances the weakness arising when an opening is cut in a closed tubular profile as the tower. In the tower segment 3 which is to be mounted on the foundation element 2 there is a corresponding door opening, and in that a double material thickness is provided in this area, the desired rigidity is achieved in the tower. Flanges 22 for mounting the tower to a traditional concrete foundation or similar are provided at the foot 21 of the foundation element.

Figure 5:
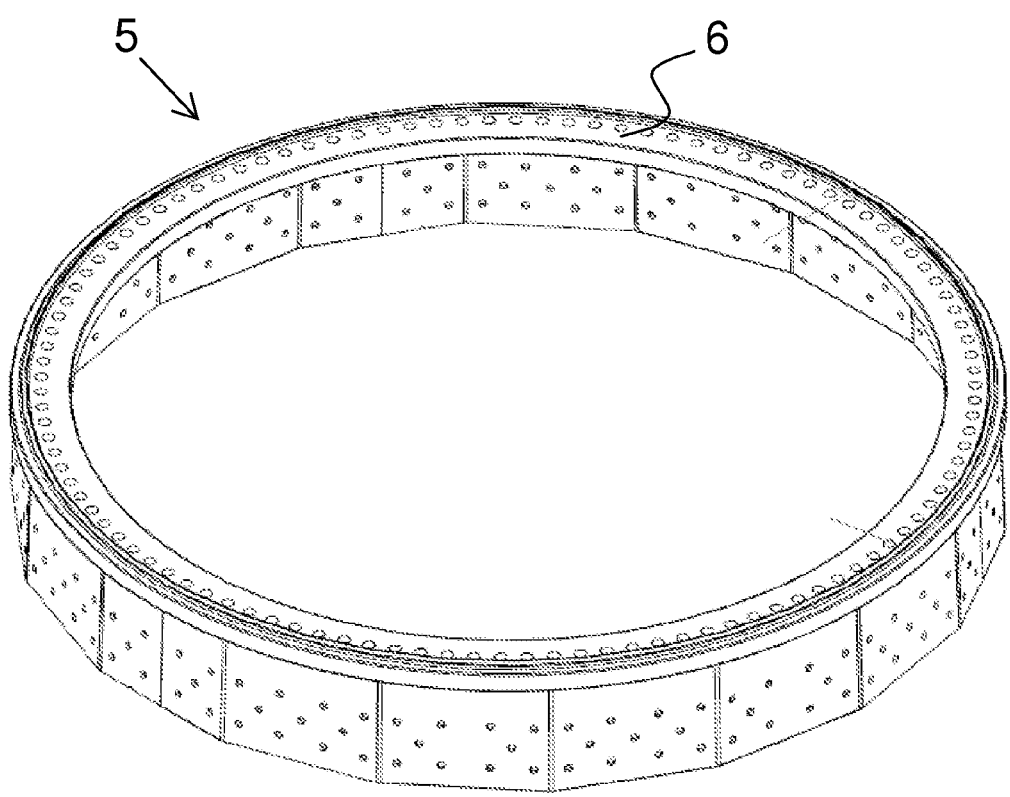
FIG. 5 shows a top element with flange.

Finally, in FIG. 5 appears a top element 5 with traditional flange 6 at the upper edge and with edged segments in the longitudinal direction of the tower, corresponding to the foundation element and the tower elements 3, 4. This top element 5 is, like the other elements 3 and 4, provided with inwardly facing flanges 12 to which the traditional flange 6 is mounted and upon which the traditional flange 6 rests as well. Thus is the fact that the flange 6 and the load intended for it transmit this load, not only along the outer periphery of the tower but also on the inwardly facing flanges 12 which thus act as columns inside the elements 2, 3, 4 and 5.

The invention claimed is:

1. A tower element for a tower having a plurality of tower elements mounted on top of each other, wherein the tower element comprises:
   an outer surface,
   a periphery and
   an inner surface,
   wherein the periphery of the tower element is made up of a plurality of segments wherein each segment is provided with one or more inwardly facing flanges at longitudinal sides thereof,
   wherein each flange is adapted to be connected to one or more corresponding flanges on laterally arranged and abutting segments of the tower element when the tower element is assembled, thus constituting an element of a casing for the tower,
   wherein each segment is made with an upper portion configured to overlap with a lower portion of another tower element when two elements are arranged on top of one another, thereby producing joints being transverse to the longitudinal extent of the tower;
   wherein each segment is adapted to form a butt joint with another segment of another element at the inwardly facing flanges, such that a lowermost edge of a flange of a segment of an upper element rests on an uppermost edge of a flange of a segment of a lower element when the upper and lower elements are arranged on top of one another.

2. Tower element according to claim 1, wherein one or more corners are notched on the inwardly facing flanges on at least a downwardly facing edge of a segment.

3. Tower element according to claim 1, wherein the lower tower element is a foundation element.

4. Tower element according to claim 3, wherein the tower element is fastened to one or more foundation segments which are fixed to a foundation, where the one or more foundation segments constitute a reinforcement of at least part of a lowermost part of the tower element.

5. Tower element according to claim 1, wherein one or more corners on the inwardly facing flanges are notched on an upwards facing edge of a first segment for abutting on a second segment in a tower element or a top element.

6. Tower element according to claim 1, wherein the butt joint between the inwardly facing flanges is overlapped by an inwardly facing flange of the laterally arranged and abutting segment.

7. Tower element according to claim 1, wherein the segments are joined entirely or partly by bolts and nuts at the longitudinal and inwardly facing flanges and at a transverse overlap.

8. Tower element according to claim 1, wherein all segments in the tower element are substantially of equal length, such that a tower element is formed that substantially appears with segments that start and end at the same height.

9. Tower element according to claim 1, wherein the plurality of segments are made of steel.

10. Tower element according to claim 1, wherein said tower is for a wind power plant.

11. A tower comprising:
    a first tower element according to claim 1, and
    a foundation element comprising one or more foundation segments which are fixed to a foundation,
    wherein the tower element is fastened to the foundation segments, and
    wherein the foundation segments constitute a reinforcement of at least part of a lowermost part of the tower element.

12. The tower according to claim 11, further comprising at least one additional tower element according to claim 1 mounted on top of the tower element.

* * * * *